Aug. 5, 1969    J. P. LEINHAUSER ET AL    3,459,273
HYDRAULIC DRIVE AND STEERING CONTROLS FOR AN AGRICULTURAL MACHINE
Filed Nov. 30, 1967    4 Sheets-Sheet 1

*INVENTORS*
**J. P. LEINHAUSER
R. H. FAIRBANK
D. E. BURROUGH
T. M. BARNES**

Aug. 5, 1969  J. P. LEINHAUSER ET AL  3,459,273
HYDRAULIC DRIVE AND STEERING CONTROLS FOR AN AGRICULTURAL MACHINE
Filed Nov. 30, 1967  4 Sheets-Sheet 2
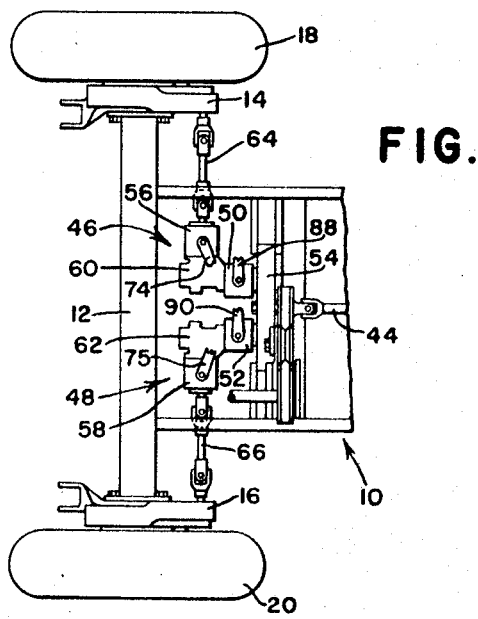
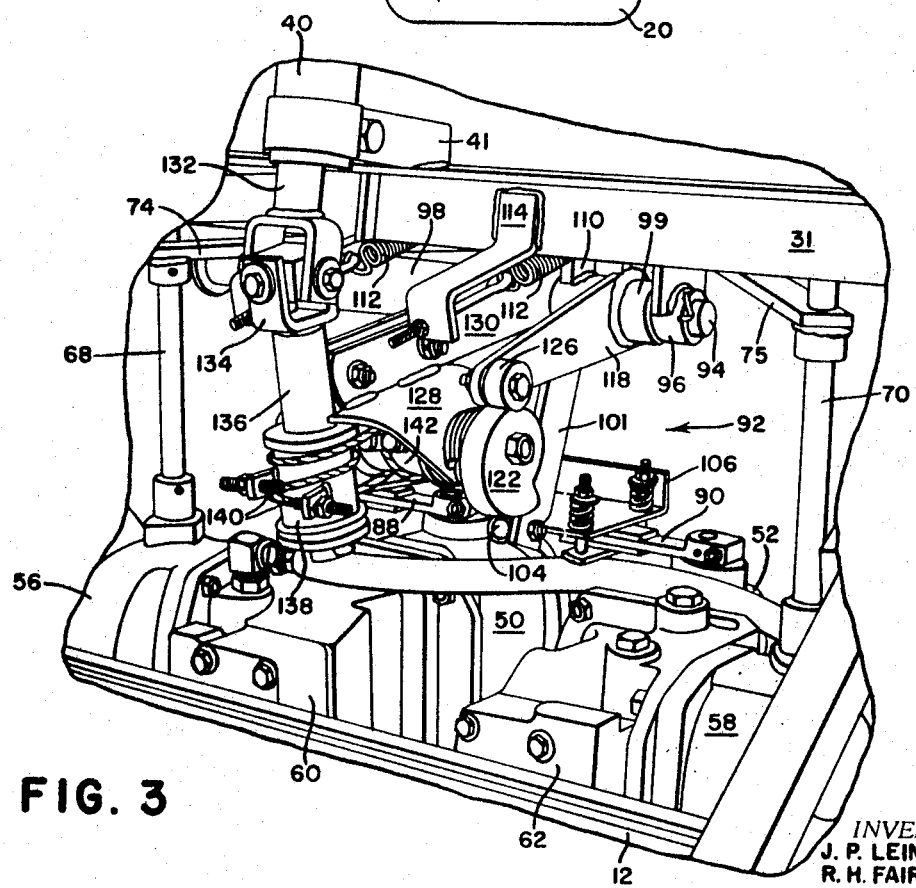
INVENTORS
J. P. LEINHAUSER
R. H. FAIRBANK
D. E. BURROUGH
T. M. BARNES

INVENTORS
J. P. LEINHAUSER
R. H. FAIRBANK
D. E. BURROUGH
T. M. BARNES

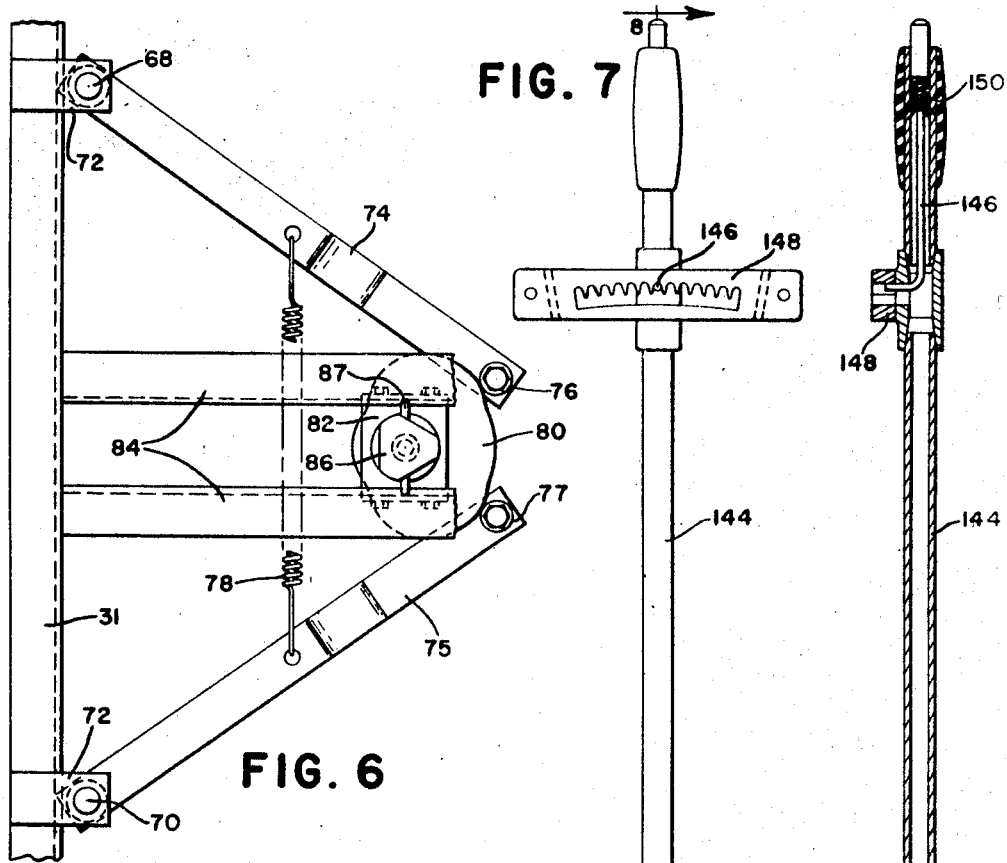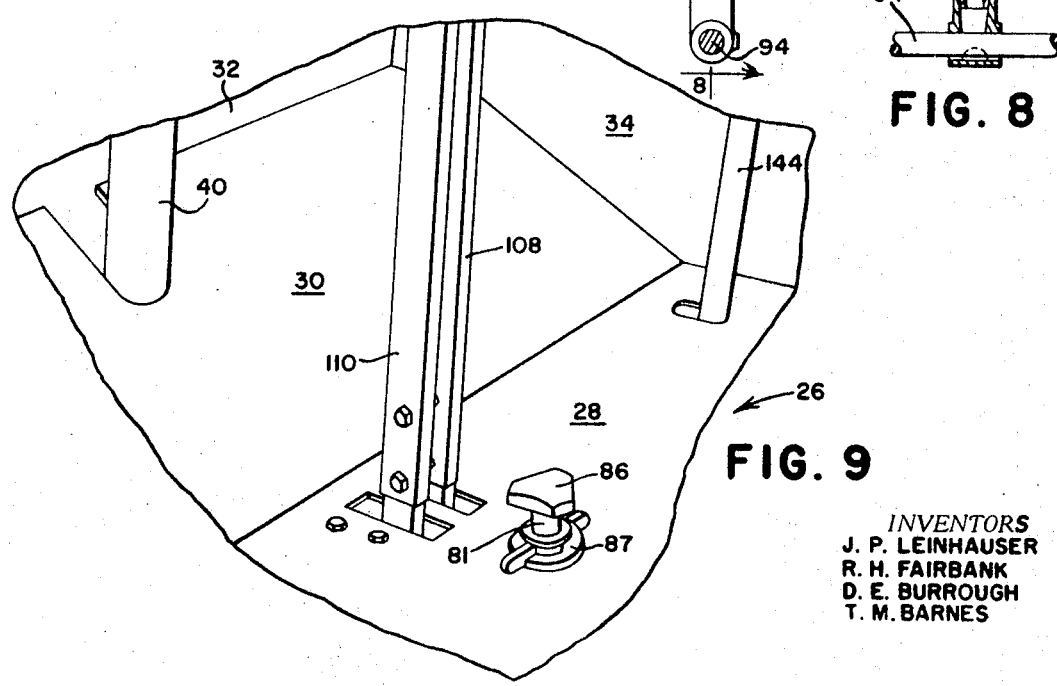

United States Patent Office 3,459,273
Patented Aug. 5, 1969

3,459,273
HYDRAULIC DRIVE AND STEERING CONTROLS
FOR AN AGRICULTURAL MACHINE
Joe Paul Leinhauser, Raymond Harry Fairbank, Donald
E. Burrough, and Theodore Marion Barnes, Ottumwa,
Iowa, assignors to Deere & Company, Moline, Ill., a
corporation of Delaware
Filed Nov. 30, 1967, Ser. No. 686,913
Int. Cl. B62d *11/00;* F16d *33/00*
U.S. Cl. 180—6.48                            11 Claims

ABSTRACT OF THE DISCLOSURE

A self-propelled windrower having separate hydrostatic drives for its right and left drive wheels, the windrower being steered by controlling the speed and direction of rotation of the respective drive wheels. Each drive includes a hydraulic motor driving one of the wheels and a variable displacement reversible pump controlled by a separate steering lever. Connected to the steering levers are a steering wheel for trim steering of the windrower and a master speed control lever for controlling the maximum forward speed position of the steering levers.

Background of the invention

This invention relates to a hydrostatic drive and steering system and the controls therefor on a self-propelled agricultural machine such as a windrower or the like.

Hydrostatic transmissions for self-propelled windrowers or the like are known, the behicle being steered by controlling the relative speeds and directions of rotation of the drive wheels. This type of drive has proved advantageous for agricultural machines such as windrowers, which require a high degree of maneuverability and also the ability of make square corners or pivot-type turns. When the drive wheels on such a machine are driven in the same direction at different speeds, a conventional turn is executed, while the stopping of one wheel while driving the other wheel results in a pivot turn about the stopped wheel. A pivot turn about a point between the drive wheels wherein the machine turns within its own width can also be obtained by driving the wheels in opposite directions. However, controls for such hydrostatic transmissions which will permit such operating flexibility while allowing simple and safe operation of the windrower have been a problem. Some previous hydrostatic driving and steering systems for this type of machine have utilized manually-actuatable control valves for controlling the fluid flow to separate hydraulic motors, which drive the respective wheels, while others have utilized some type of mechanical system for controlling the ratios in the hydraulic motors.

Summary of the invention

According to the present invention, improved mechanical controls are provided on a self-propelled machine such as a windrower or the like for controlling the speed of such hydrostatically driven wheels to provide a high degree of maneuverability for the vehicle, the controls being characterized by relatively simple operation and construction. More specifically, a pair of adjacent, fore-and-aft shiftable steering levers are provided, the fore-and-aft position of which establishes the speed and direction of rotation of the two drive wheels. Another feature of the invention is the provision of a mechanism for adjusting the maximum forward speed of the vehicle, the vehicle being steered by reducing the speed of one of the wheels relative to the other wheel, the speed of said other wheel being maintained at or below the maximum speed established by the master speed control mechanism. Still another feature of the invention is the provision of a steering wheel on the vehicle, associated with the above-described controls, so that the steering wheel can be utilized for trim steering of the vehicle, the steering wheel reducing the speed of one of the wheels from the maximum wheel speed established by the master speed control mechanism. An additional feature of the invention is the provision of such controls on a windrower having hydraulic drives for the respective front wheels, each hydraulic drive including a variable displacement pump and a variable displacement hydraulic motor, the steering controls being associated with the hydraulic pump to vary the flow rate and direction of the pump output.

Brief description of the drawings

FIG. 2 is a fragmentary plan view of the forward portion of the windrower with the windrower body and operator's station removed to illustrate the hydraulic drives.

FIG. 3 is an enlarged right front fragmentary perspective view of the forward portion of the windrower with the forward paneling removed to disclose the hydraulic drives and the lower portion of the controls therefor.

FIG. 6 is a plan view of the controls showing only the hydraulic motor displacement controls and omitting the floor of the operator's station.

FIG. 7 is a side elevation view of the master speed control lever at the operator's station.

FIG. 8 is a section of the master speed control lever as viewed along the lines 8—8 of FIG. 7.

FIG. 9 is a fragmentary perspective view of the floor of the operator's station looking toward the forward right-hand corned of the floor.

Description of the preferred embodiment

Figure 1:
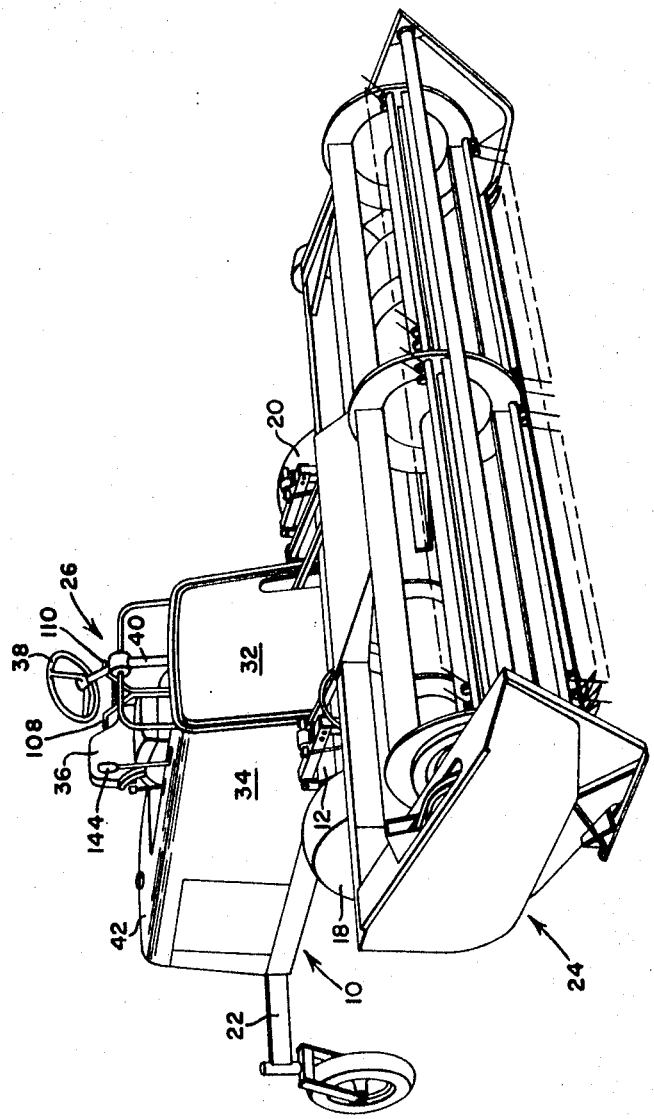
FIG. 1 is a perspective view of a self-propelled windrower in which the hydraulic drive and steering controls are embodied.

The invention is embodied in a self-propelled windrower including a main frame 10 having a forward transverse beam or member 12 at the opposite ends of which are mounted right and left wheel support structures 14 and 16 respectively, right and left forward drive wheels 18 and 20 being respectively journaled in the wheel support structures 14 and 16, which also house final drives for the respective wheels. The rearward end of the main frame 10 is supported on a rearward caster wheel structure 22, the caster wheel structure in the illustrated embodiment including a pair of wheels in fore-and-aft alignment with the drive wheels.

The main frame carries a forwardly disposed transversely elongated harvesting platform or header 24, of conventional construction, the header 24 handling the crop as the machine advances.

It is to be understood that the terms "right" and "left," as well as such terms as "forwardly" and "rearwardly," are with respect to the direction of advance of the windrower, and that such terms as "upwardly," "downwardly," "transverse," "upright," etc. are terms of convenience utilized to more clearly describe the invention and are not to be construed as limiting terms.

Forwardly mounted on the main frame 10 is an operator's station, indicated in its entirety by the numeral 26. The operator's station includes a generally horizontal floor 28 mounted on the frame and including a forwardly and upwardly inclined forward portion 30, the forward end of which is supported on a transverse support member 31, which forms a portion of the main frame 10 and is generally parallel to and rearwardly and above the transverse beam 12. A generally upright transverse front panel 32 extends upwardly from the forward beam 12, forwardly of the front portion of the floor, and a pair of generally upright side panels 34 extend upwardly from the opposite sides of the floor rearwardly of the front panel 32, the front and side panels enclosing three sides of the operator's station 26. The operator's station also includes a seat 36 and a steering wheel 38 forwardly of the seat 36, the steering wheel being mounted on a generally upright steering column 40 rearwardly adjacent to the front panel 32 and mounted to the main frame via a support bracket 41 connecting the lower end of the steering column 40 to the transverse support member 31.

A power source, conventionally an internal-combustion engine (not shown), is mounted on the frame rearwardly of the operator's station, the engine being enclosed in a rearward engine enclosure or hood 42 and including a central fore-and-aft output shaft 44 which is best seen in FIG. 2.

The right and left drive wheels 18 and 20 are respectively driven by the engine through right and left hydrostatic drives 46 and 48 respectively, the hydrostatic drives respectively including reversible, variable displacement, hydraulic pumps 50 and 52 connected to and driven by the output shaft 44 through a gear-type transmission or power distribution box 54.

Right and left variable displacement hydraulic motors 56 and 58 respectively are respectively connected to and hydraulically driven by the right and left hydraulic pumps 50 and 52 through conduit means, through right and left conduit or intermediate housings 60 and 62, the motors and pumps being connected to the intermediate housings 60 and 62 in a right-angle relationship so that each pump motor and housing forms a unitized L-shaped drive without exposed hydraulic lines, the housings 60 and 62 also enclosing conventional charge circuits and valving. The above-described dual pump, dual motor hydraulic drive is described in greater detail in the assignee's copending U.S. patent application Ser. No. 600,599, and the drive and steering controls of the present invention will be described in association with this drive system. However, it is to be understood that the invention herein is not limited to this particular drive system and the control system according to the present invention could be utilized with different hydraulic drive systems, providing of course separate drive means are provided for the separate drive wheels. For example, controls according to the present invention could be utilized in conjunction with a drive system having a single fluid pressure source with separate variable displacement motors for the separate drive wheels.

As best seen in FIG. 2, the right hydraulic motor 56 is drivingly connected to the right drive wheel 18 through a transverse drive shaft 64, which serves as the input to the final drive within the right wheel support 14, and the left hydraulic motor 58 is drivingly connected to the left drive wheel 20 through a drive shaft 66, which similarly serves as the input to the final drive in the left wheel support 16.

The variable displacement motors are of conventional construction and include shiftable swash plates, the position of which is established by the rotational position of a pair of vertical shafts 68 and 70 respectively associated with the right and left motors. The upper ends of the shafts 68 and 70 are journaled in brackets 72 attached to the transverse support member 31. Rearwardly and inwardly extending arms 74 and 75 are respectively attached to the upper ends of the shafts 68 and 70 and respectively carry roller-type cam followers 76 and 77 at their rearward ends. A transverse spring 78 interconnects the arms 74 and 75, biasing the cam followers 76 and 77 toward one another and against a cam 80, mounted on a vertical shaft 81, which in turn is journaled in a bracket 82 carried by a pair of fore-and-aft extending support members 84 extending rearwardly from the transverse support member 31. The cam and support members 84 are disposed immediately under the floor 28 and the shaft 81 extending upwardly thorugh the floor, and has a handle 86 at its upper end, so that the cam 80 can be rotated by the operator from the operator's station. A locking device 87 is associated with the shaft 81 for locking the cam in the selected position.

As best seen in FIG. 6, the angular position of the cam 80 controls the position of the arms 74 and 75 and consequently the position of the motor swash plates. A slight rotation of the cam 80 from the position shown in FIG. 6 will cause one arm to move outwardly and the opposite arm to move inwardly so that the opposite motor swash plates are oppositely adjusted, the displacement of one motor increasing while the other motor displacement decreases.

The slight adjustment of the motor swash plates permits the operator to adjust the motors so that both drive wheels 18 and 20 are driven at exactly the same speed, even though the output of the pumps 50 and 52 may be slightly different due to a difference in pump or motor efficiency due to a difference in wear or leakage in the pumps and motors. It is important that the motor output speed be identical when the steering mechanism is set for straight-ahead operation so that the vehicle will move in a straight line. The cam 80 can also be rotated 180° to cause a substantial shift of both levers in the same amount, thereby causing a substantial shift in both motor swash plates and providing a change in the drive ratio in both hydrostatic drives of the same direction and amount. As is apparent from FIG. 6, the opposite side of the cam also has a configuration wherein slight angular adjustment of the cam provides small adjustment of the motor swash plates in opposite directions so that the drives can be adjusted for identical motor speeds in both speed ranges of the motors.

Since the motors are adjusted for substantially equal displacement, the difference in the output speed of the motors for steering the vehicle is achieved by varying the output of the variable displacement pumps 50 and 52, the pumps being of the conventional axial piston type with a shiftable swash plate. The swash plate of the right pump 50 is controlled by a swingable lever 88 on top of the pump and the left pump 52 is similarly controlled by a lever 90. The pump outputs can be varied in unison through the levers 88 and 90 to vary the speed and direction of rotation of the wheels, the pumps being reversible through adjustment of the swash plates to provide reverse flow through the hydraulic motors to drive the wheels in reverse. The position of the pump levers 88 and 90 is controlled by the operator from the operator's station through a steering and speed control mechnaism indicated in its entirety by the numeral 92.

The steering and speed control mechanism includes a transverse shaft 94 having its opposite ends journaled in a pair of brackets 96 depending from the transverse support member 31. Coaxially mounted on the shaft 94 are a pair of rotatable hubs 98 and 99 and depending from the respective hubs 98 and 99 are a pair of arms 100 and 101, the right arm 100 having its lower end connected to the end of the right pump lever 88 by an adjustable rod 102 and the left arm 101 having its lower end connected to the left pump lever 90 by an adjustable rod 104, whereby rotation of the hubs 98 and 99 on the shaft 94 shifts the pump levers 88 and 90. An adjustable friction device 106 is connected to the main frame and bears against the pump levers 88 and 90, the amount of force exerted on the levers and consequently the amount of force necessary to overcome the friction device being exerted through a number of adjustable springs in the friction device.

The right and left hubs 98 and 99 are rotatable by the operator by means of a pair of upright steering levers 108 and 110 respectively attached to the right and left hubs 98 and 99 and extending upwardly through the floor 28, the upper ends of the steering levers being formed with handles so that the opeartor is able to independently adjust the levers in a fore-and-aft direction. The right and left steering levers 108 and 110 are respectively biased forwardly by a pair of springs 112 having their rearward ends connected to the respective steering levers and their forward ends connected to the transverse support member 31 via a pair of brackets 114, the friction device 106 being adjusted so that the friction force on the levers 88 and 90 is less than the force exerted by the springs 112.

Also attached to the right and left hubs 98 and 99 are right and left forwardly extending arms 116 and 118 respectively. Although the springs 112 bias the steering levers 108 and 110 forwardly, the forward movement of the steering wheel levers is limited by the engagement of the lever arms 116 and 118 with a pair of coaxial steering cams 120 and 122 through roller-type cam followers 124 and 126 respectively mounted on the forward ends of the arms 116 and 118. The steering cams 120 and 122 are mounted for rotation on a transverse shaft 127 journaled in the depending legs of an inverted U-shaped bracket 128 rigidly attached to the forward end of a channel-shaped fore-and-aft extending support member 130 having its rearward end rigidly attached to the shaft 94 intermediate the right and left hubs 98 and 99.

The steering wheel 38 is connected to a rotatable steering shaft 132, which rotatably extends through the steering column 40, the steering shaft 132 including a telescoping or slip joint (not shown) and a universal joint 134 at its lower end, which is journaled in a generally upright sleeve 136 affixed to the forward end of the support member 130. A cable drum 138 is attached to and rotatable with the steering shaft at its lower end and a pair of oppositely wound cables 140 are partially wound around the drum 138 and have one end attached thereto. The opposite ends of the cables 140 are respectively wound around and attached to a pair of drums 142 respectively coaxially attached to the right and left steering cams 120 and 122, whereby rotation of the steering shaft will cause one cable to wind and the other to unwind on the drum 138 and vice versa on the other drum 142, rotating the cams 120 and 122 according to the direction that the steering wheel is turned. The cam surfaces are such that movement of the steering wheel to the right, or in a clockwise direction, causes movement of the right lever arm only, the lever arm moving upwardly, moving the right steering lever 108 rearwardly, and adjusting the swash plate of the right pump to reduce the right pump output, so that the right wheel 18 is driven at a slower speed, causing a right turn of the vehicle. Similarly, movement of the steering wheel in a counterclockwise direction reduces the left pump output only.

The shaft 94 is rotatable in the journals 96, and since the support member 130 is rigidly attached to the shaft 94, the lower end of the steering mechanism, including the cams 122 mounted on the forward end of the support member 130, are swingable in an arc about the axis of the shaft 94, the telescoping or slip joint in the steering shaft 132 permitting the swinging movement of the steering mechanism. The angular position of the shaft 94, in turn, is established by a master speed control lever 144 having its lower end keyed to the right end of the shaft 94 and extending upwardly in a radial direction relative to the shaft along the inside of the right side panel 34, the upper end of the master speed control lever being disposed on thet right side of the operator's station. Thus, by adjusting the lever 144 in a fore-and-aft direction, the operator is able to adjust the angular position of the shaft 94 and thereby position the cams 122 and 124 about the axis of the shaft 94. Since the maximum foreward position of the steering levers 108 and 110 is limited by the arms 116 and 118 engaging the cams 120 and 122 respectively, the position of the master speed control lever determines the maximum forward position of the levers 108 and 110 and thereby establishes the maximum forward pump displacement of the pumps 50 and 52 and consequently the maximum forward speed of the drive wheels 18 and 20. The speed control lever 144 is releasably locked in the position selected by the operator by a locking member 146 axially shiftable within the tubular control lever 144 and engageable with alternate teeth in a sector-like rack 148 attached to the main frame. As best seen in FIG. 8, the locking member 146 is biased toward its locking position by a spring 150, the locking member 146 being shifted to its unlocking position by depressing the exposed upper end of the locking member against the bias of the spring 150.

In operation, the operator sets the master speed control lever 144 to establish the forward speed at which he wishes the vehicle to travel, as previously described. The springs 112 bias the steering control levers 108 and 110 forwardly so that the arms 116 and 118 engage the cams 120 and 122 respectively, whereby the respective swash plate control levers 88 and 90 provide a predetermined displacement in the pumps 50 and 52. For trim steering of the vehicle, the operator utilizes the steering wheel 38, the turning of which rotates the cams 120 and 122. As previously described, the cams 120 and 122 are adjusted so that their rotation in one direction raises the right lever arm 116 only and their rotation in the opposite direction raises the left lever arm 118 only. The arm that is raised, of course, rotates its respective hub, adjusting the pump swash plate through the above-described linkages to reduce the pump displacement and thereby slow the associated drive wheel so that the vehicle turns in the direction of the slowed wheel. Of course, trim steering can also be accomplished through slight adjustment of the steering levers 108 and 110, the right lever 108 being moved slightly rearwardly to reduce the displacement of the right pump 50 and thereby slow the right wheel to turn the vehicle to the right, although such slight adjustment of the steering levers 108 and 110 is somewhat difficult to accomplish, and it is contemplated that most operators would utilize the steering wheel 38 for trim steering of the vehicle.

Figure 4:
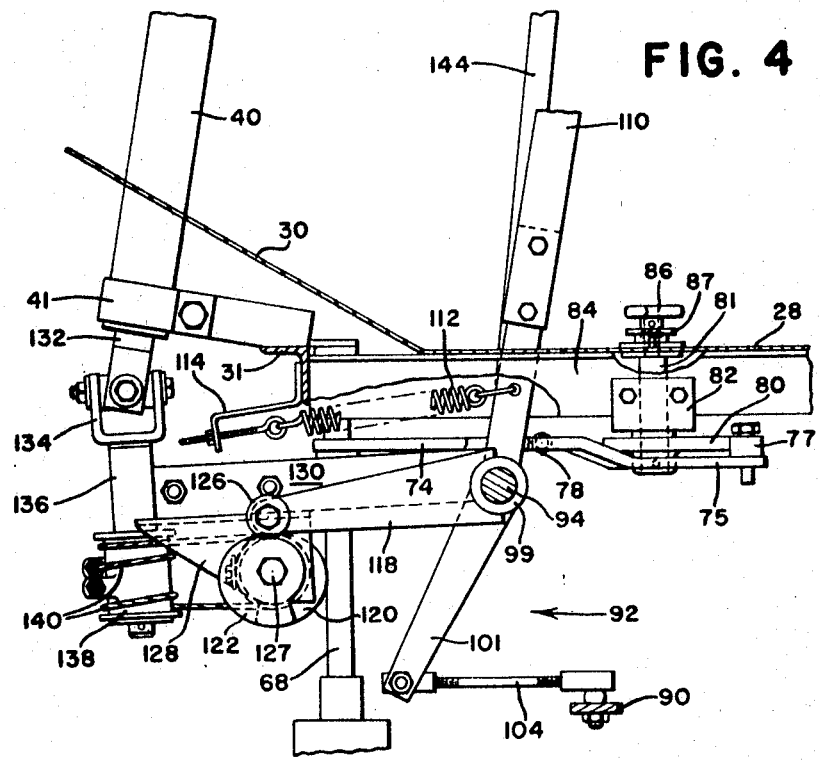
FIG. 4 is a fragmentary fore-and-aft vertical section of the lower portion of the controls as viewed along the line 4—4 of FIG. 5.
Figure 5:
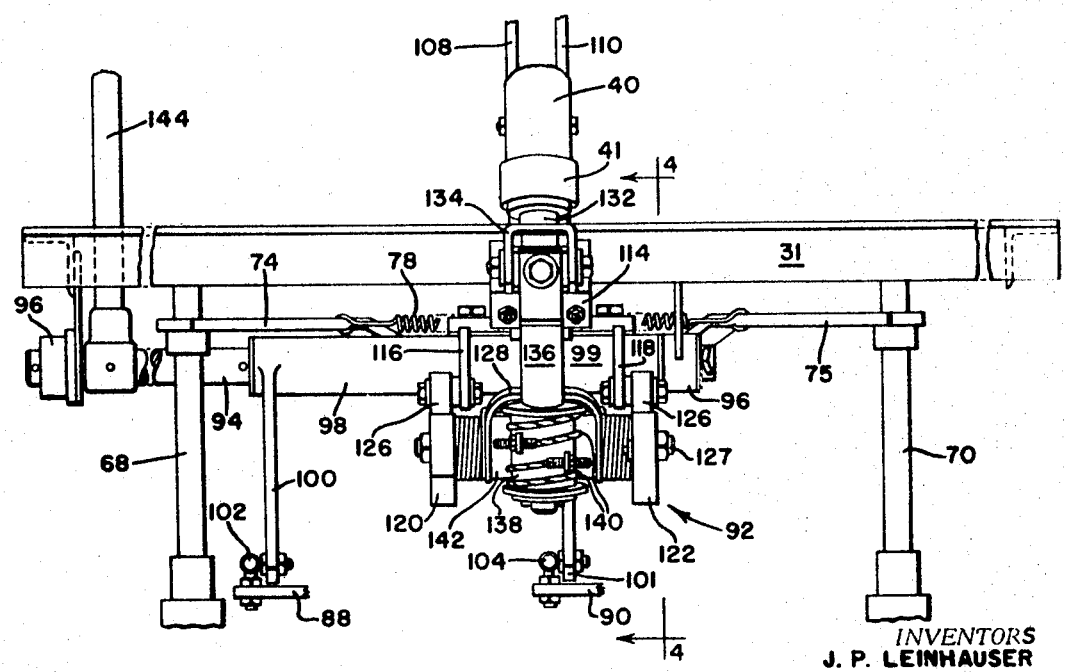
FIG. 5 is a fragmentary front elevation of the controls shown in FIG. 4.

To temporarily slow the vehicle, the steering levers 108 and 110 are pulled rearwardly in unison against the bias of the springs 112, the arms 116 and 118 raising from the cams 120 and 122 and the arms 100 and 101 shifting the pump swash plate levers 88 and 90 respectively to decrease the displacement of the pumps. The steering levers 108 and 110 can be pulled rearwardly until a zero pump displacement is obtained to provide a neutral condition. The master speed control lever can also be pulled rearwardly to maintain the steering levers in their neutral position, the neutral position of the steering levers 108 and 110 and the master speed control lever 144 being shown in FIG. 4.

To reverse the vehicle, the steering control levers 108 and 110 are pulled rearwardly from their neutral position, reversing the pump swash plates and thereby reversing the flow direction of the output of the pumps. The further to the rear that the levers 108 and 110 are pulled, the greater the reverse displacement of the pumps and consequently the greater the rearward speed of the vehicle.

For a sharp turn in forward operation of the vehicle, the speed of one of the wheels is greatly reduced relative to the speed of the other wheel by pulling one of the steering levers rearwardly a considerable distance relative to the other lever. For a pivot turn about one of the drive wheels, the lever on the side toward which the vehicle is turned is pulled rearwardly to the neutral position, stopping the one drive wheel while the other driving wheel drives the windrower about the stopped wheel, the speed of the pivot depending on the position of the control lever which controls the driving wheel. For a spin turn, wherein the vehicle turns about a point between the drive wheels, one steering lever is moved to a reverse position while the other is moved to a forward position.

If, during field operation of the machine, it is desired that the header 24 make a square corner, as is often the case, the vehicle is driven forwardly until the header cuts through the standing crop, at which time both steering levers are pulled back to neutral and then the lever on the side toward which the vehicle is to be turned is pulled to reverse so that the windrower pivots rearwardly about the stopped wheel. The reverse pivot prevents the header from moving through the standing crop and after the windrower has turned 90°, the levers are both pushed forwardly to start forward movement of the windrower.

As previously described, the displacement of the motors 56 and 58 can be substantially shifted by rotating the handle 86 to provide alternate speed ranges, it being contemplated that one speed range be provided for field operation of the machine wherein higher torques and lower speeds are required and the second speed range be provided for transport of the machine wherein lower torques and higher speeds are desired, the motor displacement being increased for the transport range.

As is apparent from the above, the speed and steering controls are relatively simple to operate and provide a maximum degree of maneuverability for the vehicle which is particularly advantageous for windrowers or the like.

We claim:

1. In a vehicle having an operator's station, right and left independently rotatable drive elements and right and left infinitely variable ratio hydraulic drive means respectively adapted to independently drive the right and left drive elements at infinitely variable speeds, the combination therewith of improved control means for controlling the output speed and direction of rotation of the hydraulic drives and comprising: right and left manually shiftable steering levers respectively mounted on the vehicle at the operator's station for forward and rearward adjustment; linkage means respectively connecting the right and left steering levers to the right and left hydraulic drive means to respectively increase and decrease the forward output speed of the respective hydraulic drives in response to forward and rearward adjustment of the steering levers; and a manually adjustable master speed control mechanism operatively associated with the steering levers to adjustably limit the forward movement of the steering levers and thereby selectively vary the maximum forward output speed of the hydraulic drives.

2. The invention defined in claim 1 wherein the master speed control mechanism includes a manually adjustable control lever mounted for forward and rearward adjustment at the operator's station to respectively increase and decrease the maximum forward output speed.

3. The invention defined in claim 1 wherein the master speed control mechanism includes a selectively adjustable stop means and means adapted to connect the steering levers to the stop means to adjustably limit the maximum forward position of the steering levers and thereby preselect the maximum forward output speed and also including spring means associated with the respective steering levers for biasing the steering levers toward the stop means.

4. The invention defined in claim 3 wherein the right and left hydraulic drive means each includes a variable delivery hydraulic pump and a hydraulic motor hydraulically connected to and driven by the pump, and the right and left steering levers are operatively connected to the hydraulic pumps in the respective drive means to vary the pump discharge.

5. The invention defined in claim 4 wherein the hydraulic pumps are reversible hydraulic pumps and the steering levers are respectively shiftable into a neutral position wherein they establish a zero flow condition in the respective pumps and are shiftable forwardly from the neutral position to increase the discharge flow of the respective pumps for forward driving of the respective motors and rearwardly from the neutral position to increase the discharge flow in the opposite direction for driving the respective motors in reverse direction.

6. The invention defined in claim 5 wherein the hydraulic motors and the respective hydraulic drives are variable displacement motors and further including motor control means adapted to vary the displacement of both motors and thereby shift the motor output speed for a given pump discharge rate.

7. The invention defined in claim 5 wherein the motor control means also includes adjusting means for varying the displacement of one motor relative to the other within a limited degree.

8. The invention defined in claim 1 and including a steering wheel mounted at the operator's station adjacent the steering levers and means operatively connecting the steering wheel to the right and left hydraulic drives for alternately reducing the output speed of the right and left hydraulic drives when the steering wheel is turned in its alternate directions.

9. The invention defined in claim 8 wherein the means connecting the steering wheel to the hydraulic drives includes the adjustable stop means, the steering wheel being operatively connected to the stop means to rearwardly adjust the maximum forward position of one steering lever when turned in one direction and the other steering lever when turned in the other direction.

10. The invention defined in claim 8 wherein the means connecting the steering wheel to the hydraulic drives includes a cam means rotatable in response to rotation of the steering wheel, cam follower means operatively connected to the respective hydraulic drives and the cam means to alternately reduce the drive ratio in hydraulic drives in response to rotation of the cam means in its alternate directions.

11. A self-propelled harvester comprising: a mobile main frame mounted on right and left transversely spaced drive wheels; a forward harvesting device carried by the main frame; a power source and an operator's station mounted on the frame; right and left hydraulic drives respectively including reversible variable displacement hydraulic pumps driven by the power source and hydraulic motors drivingly connected to the respective drive wheels to independently drive the respective wheels in either direction at infinitely variable speeds; right and left control levers mounted at the operator's station for forward and rearward shifting from a central neutral position; linkage means respectively connecting the right and left control levers to the pumps in the right and left drives to adjust the displacement of the pumps for zero output when the respective levers are in their neutral position, to increase the displacement of the respective pumps for increasing flow in a direction that drives the motors forwardly as the control levers move forwardly from their neutral positions and to increase the displacement of the respective pumps for flow in the opposite direction as the respective levers move rearwardly from said neutral position; and a manually adjustable master speed control mechanism operatively associated with the steering levers to adjustably limit the forward movement of the steering levers and thereby selectively limit the maximum displacement of the respective pumps.

References Cited

UNITED STATES PATENTS

| | | | |
|---|---|---|---|
| 2,446,242 | 8/1948 | Orshansky | 180—6.48 |
| 2,818,126 | 12/1957 | Vogelaar | 180—6.48 |
| 2,941,609 | 6/1960 | Bowers et al. | 180—6.48 |
| 3,161,245 | 12/1964 | Thoma | 180—6.48 |
| 3,306,385 | 2/1957 | Kempson | 180—6.48 |
| 3,363,709 | 1/1968 | Hokerikar | 180—6.48 |
| 3,362,493 | 1/1968 | Davis et al. | 180—6.48 X |

LEO FRIAGLIA, Primary Examiner

J. A. PEKAR, Assistant Examiner

U.S. Cl. X.R.

60—53

UNITED STATES PATENT OFFICE
CERTIFICATE OF CORRECTION

Patent No. 3,459,273  Dated 5 August 1969

Inventor(s) Joe Paul Leinhauser, Raymond Harry Fairbank, Donald E. Burrough, and Theodore Marion Barnes It is certified that error appears in the above-identified patent and that said Letters Patent are hereby corrected as shown below:

Column 8, line 26, change "5" to -- 6 --; line 39, cancel "the" (1st occ.).

SIGNED AND SEALED
FEB 2 1971

(SEAL)
Attest:

Edward M. Fletcher, Jr.

Attesting Officer

WILLIAM E. SCHUYLER, JR.
Commissioner of Patents